US008605390B2

(12) United States Patent
Kikuchi et al.

(10) Patent No.: US 8,605,390 B2
(45) Date of Patent: Dec. 10, 2013

(54) HEAD GIMBAL ASSEMBLY HAVING PLURALITY OF TERMINALS AND DISK DRIVE WITH THE SAME

(75) Inventors: Takafumi Kikuchi, Akiruno (JP); Yasutaka Sasaki, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 57 days.

(21) Appl. No.: 13/295,295

(22) Filed: Nov. 14, 2011

(65) Prior Publication Data

US 2012/0134047 A1    May 31, 2012

(30) Foreign Application Priority Data

Nov. 30, 2010   (JP) .................................. 2010-267580

(51) Int. Cl.
*G11B 5/55* (2006.01)
(52) U.S. Cl.
USPC ....................................................... 360/264.2
(58) Field of Classification Search
None
See application file for complete search history.

(56) References Cited

U.S. PATENT DOCUMENTS

| 5,978,177 | A | 11/1999 | Takasugi | |
|---|---|---|---|---|
| 6,057,986 | A | 5/2000 | Takasugi | |
| 6,144,530 | A | 11/2000 | Shiraishi et al. | |
| 6,351,351 | B1 | 2/2002 | Takasugi | |
| 6,891,700 | B2 * | 5/2005 | Shiraishi et al. | 360/245.9 |
| 7,372,669 | B2 * | 5/2008 | Deguchi et al. | 360/245.9 |
| 7,724,478 | B2 | 5/2010 | Deguchi et al. | |
| 8,199,442 | B2 | 6/2012 | Okawara et al. | |
| 2010/0220414 | A1 * | 9/2010 | Klarqvist et al. | 360/245.8 |

FOREIGN PATENT DOCUMENTS

| JP | 3-110627 | 11/1991 |
|---|---|---|
| JP | 10-198935 | 7/1998 |
| JP | 11-039629 | 2/1999 |
| JP | 11-185233 | 7/1999 |
| JP | 2000-231709 | 8/2000 |
| JP | 2006-049751 | 2/2006 |
| JP | 2006-202358 | 8/2006 |
| JP | 2010-086649 | 4/2010 |

OTHER PUBLICATIONS

Japanese Office Action for corresponding Japanese Patent Application No. 2010-267580, dated May 8, 2012, in 5 pages.

* cited by examiner

*Primary Examiner* — David D Davis
(74) *Attorney, Agent, or Firm* — Knobbe, Martens, Olson & Bear LLP

(57) ABSTRACT

According to one embodiment, a head gimbal assembly includes a suspension, a head, and a conductor trace on the suspension, including one end portion electrically connected to the head and the other end portion includes a terminal area. The conductor trace includes a thin metal plate, a base insulating layer on the thin metal plate, a trace pattern on the base insulating layer, including a plurality of conductors and a plurality of first and second connection terminals continuous with the conductors, and a cover insulating layer on the base insulating layer, configured to cover the trace pattern. The terminal area includes an opening including two opposite side edges, the first connection terminals extend into the opening from one of the side edges thereof, and the second connection terminals extend into the opening from the other side edge thereof.

14 Claims, 7 Drawing Sheets

HEAD GIMBAL ASSEMBLY HAVING PLURALITY OF TERMINALS AND DISK DRIVE WITH THE SAME

CROSS-REFERENCE TO RELATED APPLICATIONS

This application is based upon and claims the benefit of priority from Japanese Patent Application No. 2010-267580, filed Nov. 30, 2010; the entire contents of which are incorporated herein by reference.

FIELD

Embodiments described herein relate generally to a head gimbal assembly used in a disk drive and the disk drive provided with the same.

BACKGROUND

In general, a disk drive, e.g., a magnetic disk drive, comprises a magnetic disk in a case, spindle motor configured to support and rotate the disk, head stack assembly that supports magnetic heads, circuit board unit, etc. The head stack assembly comprises a bearing and head gimbal assemblies extending from the bearing. Each head gimbal assembly comprises a suspension supporting the magnetic heads and a conductor trace that electrically connects the heads to the circuit board unit.

The circuit board unit integrally comprises a base portion, on which a head IC, connectors, etc., are mounted, and a main flexible printed circuit board (main FPC) extending from the base portion to the vicinity of the bearing. An extended end portion of the main FPC constitutes a plurality of terminal areas, each of which carries a plurality of connection pads thereon. The terminal areas are attached to the bearing of the head actuator.

The conductor trace on the suspension has one end connected to the magnetic head and the other end constituting the terminal areas. The terminal areas each comprise a plurality of connection terminals connected individually to conductors. These connection terminals are soldered to their corresponding connection pads of the main FPC. The magnetic head is electrically connected to a circuit board unit through the conductor trace and main FPC.

In order to further increase or improve the capacity and reliability of modern disk drives, addition of various functions is being discussed. The additional functions include an HDI sensor, a two-step actuator, a reading function, a DFH function, high-frequency- or heat-assisted recording, etc. In adding these functions, it is necessary to increase the number of connection terminals at a terminal area on the rear end side, as well as the number of conductors of the conductor trace. However, the size of the rear-end-side terminal area is limited. In the case of an extended design based on the conventional soldering system, therefore, the possibility of a short-circuit due to solder bridging increases if nine or more terminals are arranged on the terminal area. Thus, it is urgent to establish an effective connection system to cope with a further increase in the number of terminals in each set.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a head gimbal assembly comprises: a suspension; a head supported by the suspension; and a conductor trace on the suspension, comprising one end portion electrically connected to the head and the other end portion comprising a terminal area. The conductor trace comprises a thin metal plate, a base insulating layer on the thin metal plate, a trace pattern on the base insulating layer, comprising a plurality of conductors and a plurality of first connection terminals and a plurality of second connection terminals continuous with the conductors, and a cover insulating layer on the base insulating layer, configured to cover the trace pattern. The terminal area of the conductor trace comprises an opening comprising two opposite side edges, the first connection terminals extending into the opening from one of the side edges thereof, the second connection terminals extending into the opening from the other side edge thereof.

Figure 1:
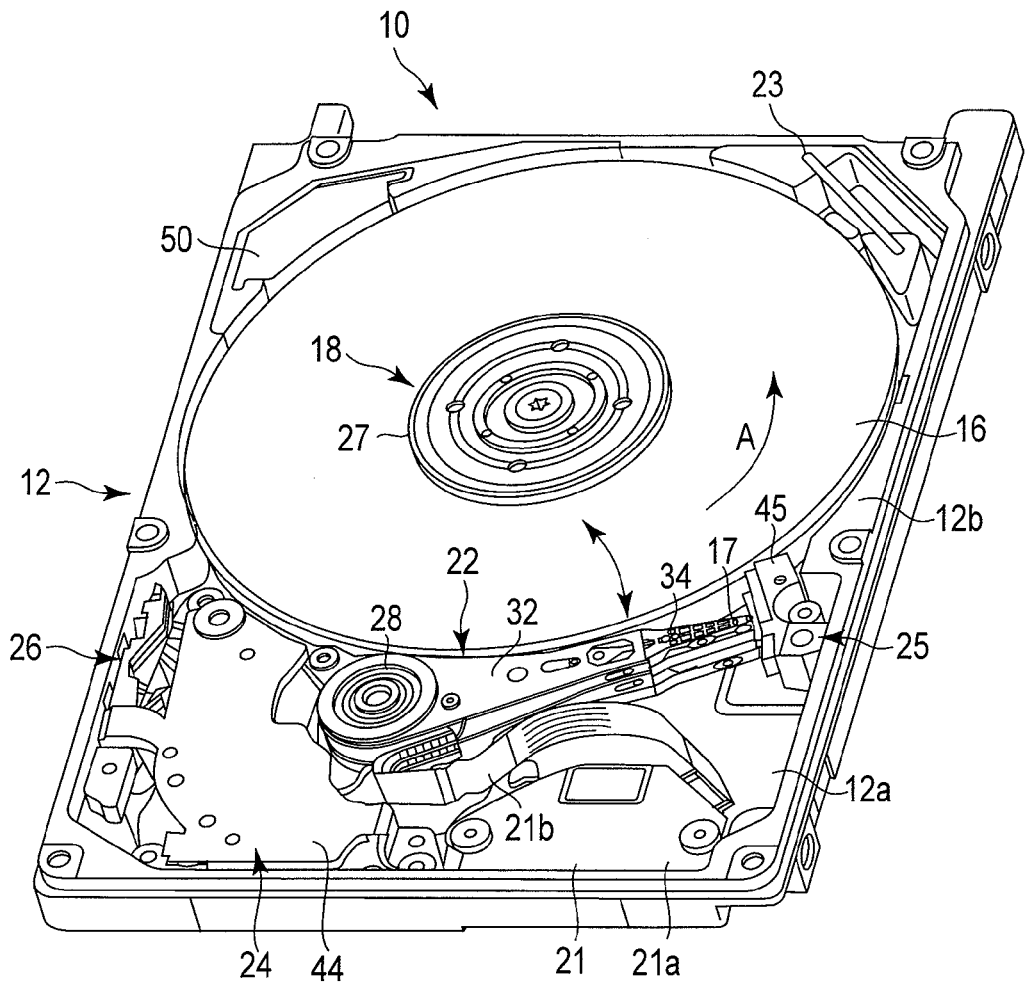
FIG. 1 is an exemplary perspective view showing an HDD according to a first embodiment.

FIG. 1 shows the internal structure of a magnetic disk drive (HDD) according to a first embodiment with its top cover removed. As shown in FIG. 1, the HDD comprises a housing 10. The housing 10 comprises a base 12 in the form of an open-topped rectangular box and a top cover (not shown), which is attached to the base by screws such that it closes the top opening of the base. The base 12 comprises a rectangular bottom wall 12a and sidewall 12b set up along the peripheral edge of bottom wall.

The housing 10 contains two magnetic disks 16 for use as recording media and a spindle motor 18 for use as a drive section that supports and rotates the magnetic disks 16. The spindle motor 18 is arranged on the bottom wall 12a. Each magnetic disk 16 has a diameter of, for example, 65 mm (2.5 inches) and comprises magnetic recording layers on its upper and lower surfaces, individually. The magnetic disks 16 are coaxially fitted on a hub (not shown) of the spindle motor 18 and clamped and secured to the hub by a clamp spring 27. Thus, the magnetic disks 16 are supported parallel to the bottom wall 12a of the base 12. The disks 16 are rotated at a predetermined speed, e.g., 5,400 or 7,200 rpm, by the spindle motor 18.

The housing 10 contains a plurality of magnetic heads 17, head stack assembly (HSA) 22, and voice coil motor (VCM) 24. The magnetic heads record data on and reproduce data from the magnetic disks 16. The HSA 22 supports the heads 17 for movement relative to the disks 16. The VCM 24 pivots and positions the HSA. The housing 10 further contains a ramp loading mechanism 25, latch mechanism 26, and board unit 21. The ramp loading mechanism 25 holds the magnetic heads 17 in a retracted position off the magnetic disks 16 when the heads are moved to the outermost peripheries of the disks. The latch mechanism 26 holds the HSA in its retracted position if the HDD is jolted. Electronic components are mounted on the board unit 21.

A printed circuit board (not shown) is attached to the outer surface of the bottom wall 12a of the base 12 by screws. This circuit board controls the operations of the spindle motor 18, VCM 24, and magnetic heads 17 through the board unit 21. A circulatory filter 23 that traps dust produced in the housing 10 as a movable part or parts are operated is arranged on the sidewall of the base 12. The filter 23 is located outside the magnetic disks 16. Likewise, a breather filter 50 that traps dust in the external air introduced into the housing 10 is provided on the sidewall of the base 12.

Figure 2:
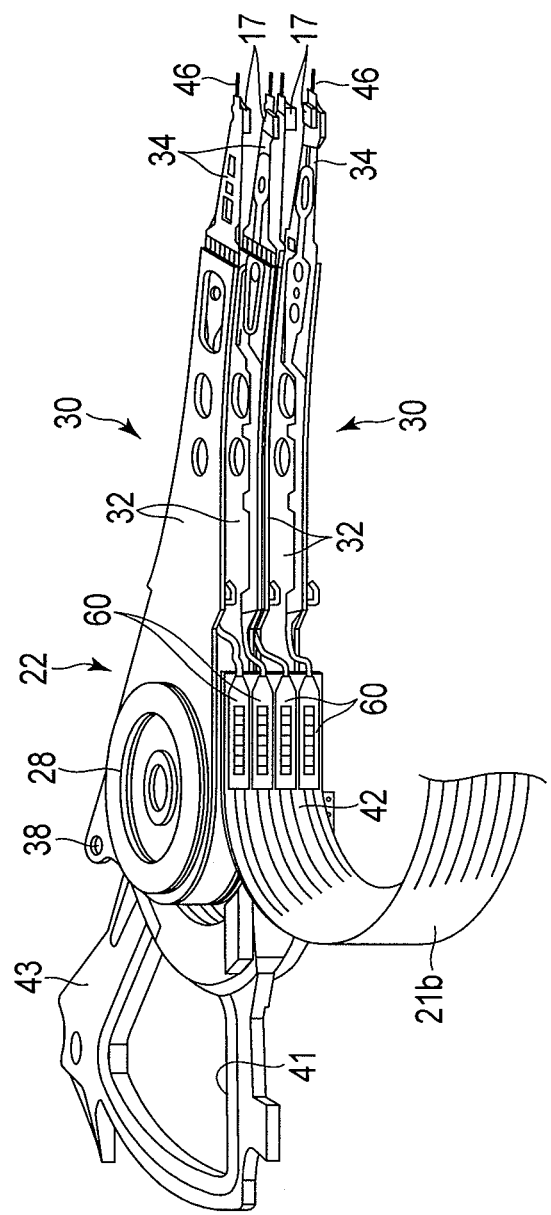
FIG. 2 is an exemplary perspective view showing a head stack assembly of the HDD.

FIG. 2 is a perspective view of the HSA 22. As shown in FIGS. 1 and 2, the HSA 22 comprises a rotatable bearing unit 28 and a plurality of stack members mounted in layers on the bearing unit 28. The stack members include four head gimbal assemblies (HGAs) 30 and two spacer rings sandwiched between the HGAs.

The bearing unit 28 is located at a distance from the center of rotation of the magnetic disks 16 longitudinally relative to the base 12 and near the outer peripheral edges of the disks 16. The bearing unit 28 comprises a pivot set up on the bottom wall 12a of the base 12 and a cylindrical sleeve rotatably supported on the pivot by bearing means.

Figure 3:
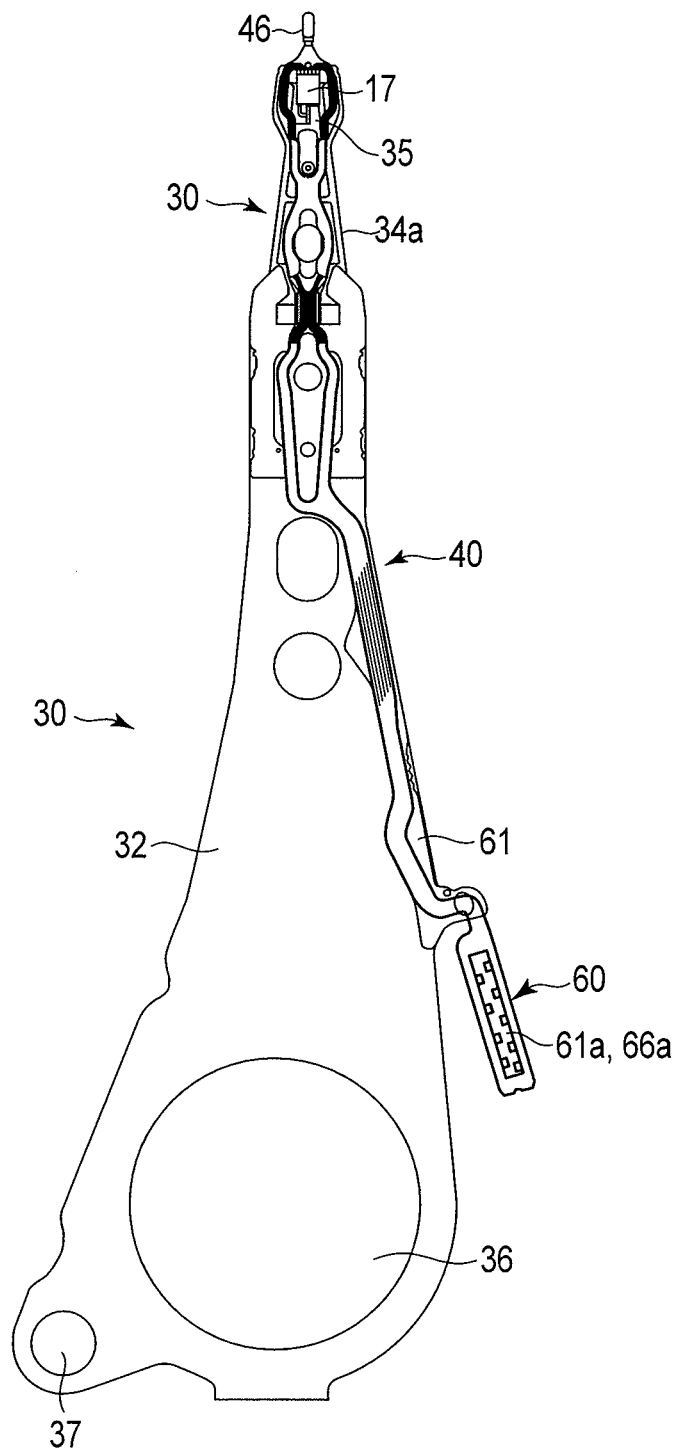
FIG. 3 is an exemplary plan view showing a head gimbal assembly of the head stack assembly.

As shown in FIGS. 2 and 3, each HGA 30 comprises an arm 32 extending from the bearing unit 28, a suspension 34 extending from the arm, and one of the magnetic heads 17 supported on the extended end of the suspension by a gimbal 35.

The arm 32 is a thin flat plate formed by laminating, for example, stainless-steel, aluminum, and stainless-steel sheets. A circular through-hole 36 is formed in one end or proximal end of the arm 32. Further, the arm 32 comprises a lug protruding from its proximal end and formed with a positioning hole 37. The suspension 34 comprises a load beam 34a in the form of an elongated plate spring and the gimbal 35 mounted on the load beam. The suspension 34 has its proximal end secured to the distal end of the arm 32 by spot welding or adhesive bonding and extends from the arm. The arm 32 and the load beam 34a of the suspension 34 may be integrally formed from the same material. The HGA 30 may be a concept that does not include an arm.

Each magnetic head 17 comprises a substantially rectangular slider and head section formed on the slider. The head section comprises, for example, a recording element and magnetoresistive (MR) element for reproduction. The magnetic head 17 is secured to the gimbal 35 on the distal end portion of the suspension 34. The head 17 is subjected to a predetermined head load produced by the spring force of the load beam 34a and directed to the surface of the magnetic disk 16.

A flexure 40 for use as a conductor trace is mounted on the arm 32 and load beam 34a. The magnetic head 17 is electrically connected to a main FPC 21b (described later) through the flexure 40.

As shown in FIGS. 1 and 2, the four HGAs 30 and spacer rings are fitted on the sleeve of the bearing unit 28 that is passed through the respective through-holes of the arms 32 and spacer rings, and are laminated along the axis of the sleeve. A positioning screw 38 is passed through the positioning holes 37 in the four arms 32 and positioning holes in the spacer rings from above and driven into a positioning hole in a washer. Thus, the four arms 32 and spacer rings are relatively located in predetermined positions with respect to the circumferential direction of the bearing unit 28.

The four arms 32 are located parallel to one another with predetermined spaces therebetween and extend in the same direction from the bearing unit 28. The two upper arms 32 are located parallel to each other with a predetermined space therebetween, and the suspensions 34 and magnetic heads 17 on these arms face one another. Likewise, the two lower arms 32 are located parallel to each other with a predetermined space therebetween, and the suspensions 34 and magnetic heads 17 on these arms face one another.

A support frame 43 of a synthetic resin is integrally molded on one of the spacer rings. The support frame 43 extends from the bearing unit 28 on the opposite side to the arms 32. A voice coil 41 that constitutes a part of the VCM 24 is embedded in the support frame 43.

As seen from FIG. 1, the lower end portion of the pivot of the bearing unit 28 is secured to the base 12 with the HSA 22 of the above configuration incorporated on the base 12. The bearing unit 28 stands substantially parallel to the spindle of the spindle motor 18. Each magnetic disk 16 is located between its corresponding two of the HGAs 30. When the HDD is active, the magnetic heads 17 on the arms 32 face the upper and lower surfaces, individually, of the magnetic disk 16 and hold the disk from both sides. The voice coil 41 secured to the support frame 43 is located between a pair of yokes secured to the base 12. Thus, the voice coil, along with the yokes and a magnet (not shown) secured to one of the yokes, constitutes the VCM 24.

As shown in FIG. 1, the board unit 21 comprises a main body 21a formed of a flexible printed circuit board, which is secured to the bottom wall 12a of the base 12. Electronic components (not shown), including a head amplifier, are mounted on the main body 21a. A connector (not shown) for connection with the printed circuit board is mounted on the bottom surface of the main body 21a.

The board unit 21 comprises the main flexible printed circuit board (main FPC) 21b extending from the main body 21a. An extended end of the main FPC 21b constitutes a connecting end portion 42. As described later, the connecting end portion 42 comprises a plurality of connection pads and is secured to the vicinity of the bearing unit 28 of the HSA 22. The flexure 40 of each HGA 30 is mechanically and electrically connected to the connecting end portion 42. Thus, the board unit 21 is electrically connected to each magnetic head 17 through the main FPC 21b and flexure 40.

The ramp loading mechanism 25 comprises a ramp 45 (FIG. 1) and tabs 46 (FIGS. 2 and 3). The ramp 45 is arranged on the bottom wall 12a of the base 12 and located outside the magnetic disks 16. The tabs 46 extend individually from the respective distal ends of the suspensions 34. When the HSA 22 pivots around the bearing unit 28 so that the magnetic heads 17 move to the retracted position outside the disks 16, each of the tabs 46 engages with a ramp surface formed on the ramp 45 and is then pushed up the ramp surface. Thereupon, the heads 17 are unloaded and held in the retracted position.

The HGA 30 and flexure 40 will now be described in detail. In the HGA 30, as shown in FIG. 3, the magnetic head 17 is electrically connected to the main FPC 21b by the flexure 40. The flexure 40 is affixed to the inner surface of the arm 32 and suspension 34 and extends from the distal end of the suspension to the proximal end portion of the arm. The flexure 40 is in the form of an elongated band as a whole, whose distal end is electrically connected to electrodes of the magnetic head 17. The other end portion of the flexure 40 extends outward from the proximal end portion of the arm 32 and constitutes a terminal area 60.

As shown in FIG. 3, the flexure 40 is mounted on the inner surface of the suspension 34 and extends from the distal end of the suspension to the proximal end portion of the arm 32. The flexure 40 comprises a thin metal plate 61 of stainless steel or the like, insulating layer formed on the metal plate, trace pattern (including a plurality of conductors) of copper foil, and cover insulating layer that covers the trace pattern. The flexure 40 is in the form of an elongated band as a whole, and the respective distal ends of the conductors are electrically connected individually to the electrodes (not shown) of the magnetic head 17. The other end portion of the flexure 40 extends outward from the arm 32 and constitutes a terminal area 60. Each terminal area 50 is electrically and mechanically connected to the connecting end portion 42 of the main FPC 21b. The flexure 40 is manufactured by, for example, an additive process.

As shown in FIG. 3, that part of the flexure 40 located on the side of the thin metal plate 61 is affixed or pivotally welded to the arm 32 and load beam 34a. The suspension-side end portion of the thin metal plate 61 is formed integrally with the gimbal 36.

Figure 4:
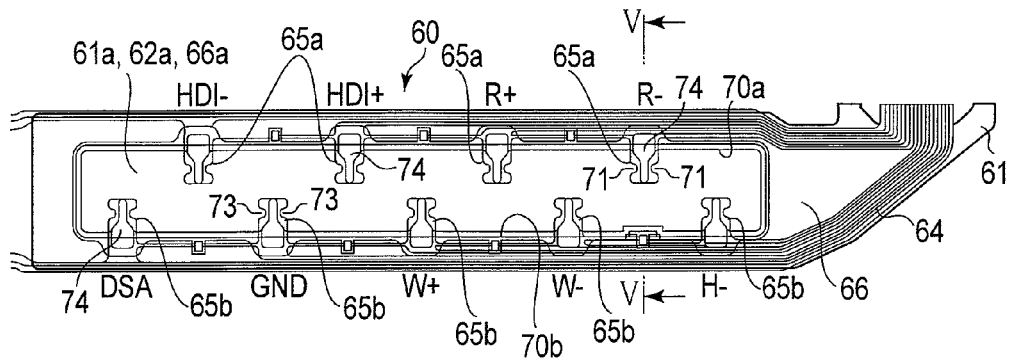
FIG. 4 is an exemplary enlarged plan view showing a terminal area of a flexure of the head gimbal assembly.
Figure 5:
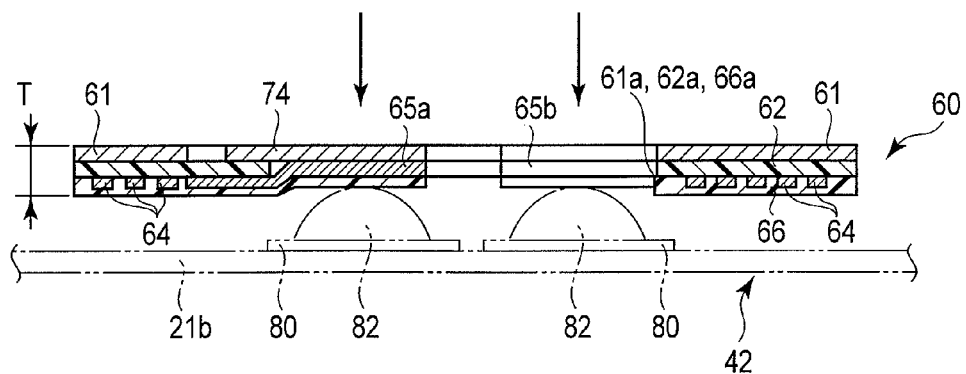
FIG. 5 is an exemplary sectional view of the terminal area taken along line V-V of FIG. 4.

FIG. 4 is an enlarged plan view showing the terminal area 60 of the flexure 40, FIG. 5 is a sectional view of the terminal area 60 taken along line A-A of FIG. 4, and FIGS. 6 to 9 show the constituent elements of the flexure, that is, the thin metal plate, base insulating layer, conductor pattern of copper foil, and cover insulating layer, respectively.

As shown in FIGS. 4 and 5, the flexure 40 comprises the thin metal plate 61 of, for example, stainless steel, base insulating layer 62 formed on the metal plate, conductor layer (trace pattern) 64 of, for example, copper foil formed on the insulating layer, and cover insulating layer 66 formed on the base insulating layer such that it covers the trace pattern 64. A resin material, e.g., polyimide resin, is used for the base and cover insulating layers 62 and 66. Thickness T of the flexure 40 is set to be, for example, 0.05 mm.

The conductor layer 64 constitutes the trace pattern of the flexure 40, one end of which is electrically connected to the electrodes of the magnetic head 17. The other end of the trace pattern comprises a plurality (e.g., nine) of connection terminals.

As shown in FIGS. 3 to 9, the terminal area 60 of the flexure 40 has an elongated, substantially rectangular shape and extends outward from the arm 32. In the terminal area 60, the thin metal plate 61, base insulating layer 62, and cover insulating layer 66 are formed with elongated rectangular openings 61a, 62a and 66a, respectively. These openings 61a, 62a and 66a extend longitudinally relative to the terminal area 60. The metal plate 61 and insulating layers 62 and 66 are laminated so that the openings 61a, 62a and 66a overlap one another.

The conductors of the trace pattern 64 are led around so that they are split on both transverse sides of the opening 61a and extend along both longitudinally extending side edges of the opening 61a on the base insulating layer 62. The trace pattern 64 comprises a plurality (e.g., four) of first connection terminals 65a formed continuous with the conductors, individually, and a plurality (e.g., five) of second connection terminals 65b formed continuous with the other conductors, individually.

The four first connection terminals 65a extend into the opening 61a from one side edge 70a, of the two longitudinally extending side edges of the opening 61a, and are exposed in the opening. Each first connection terminal 65a is in the form of a band extending, for example, at right angles to the side edge 70a or transversely relative to the terminal area 60 in this case. Further, each first connection terminal 65a extends from the side edge 70a of the opening 61a to, for example, the center with respect to the width of the opening. To facilitate permeation of solder (described later), recesses 71 are formed individually on the opposite side edges of the distal end portion of each first connection terminal 65a. The four first connection terminals 65a are arranged at regular intervals along the side edge 70a of the opening 61a.

The five second connection terminals 65b extend into the opening 61a from its other side edge 70b, which faces the side edge 70a, and are exposed in the opening. Each second connection terminal 65b is in the form of a band extending, for example, at right angles to the side edge 70b or transversely relative to the terminal area 60 in this case. Further, each second connection terminal 65b extends from the side edge 70b of the opening 61a to, for example, the center with respect to the width of the opening. To facilitate permeation of the solder, recesses 73 are formed individually on the opposite side edges of the distal end portion of each second connection terminal 65b. The five second connection terminals 65b are arranged at regular intervals along the side edge 70b of the opening 61a. According to the present embodiment, moreover, the five second connection terminals 65b are staggered longitudinally relative to the opening 61a from the four first connection terminals 65a. In this case, each first connection terminal 65a is opposed to a space between its corresponding two adjacent second connection terminals 65b. Thus, the four first connection terminals 65a and five second connection terminals 65b are alternately arranged longitudinally relative to the terminal area 60, that is, in a zigzag.

The four first connection terminals 65a individually constitute, for example, terminals R+ and R−, which are connected to the reproduction element of the magnetic head by the conductors, and terminals HDI− and HDI+ used for HDI control of the magnetic head. The five second connection terminals 65b individually constitute, for example, a terminal H+ connected to a heater of the magnetic head by the conductors, terminals W− and W+ connected to the recording element of the magnetic head, terminal GND connected to the ground, and terminal DSA used for DSA control of the magnetic head.

Figure 6:
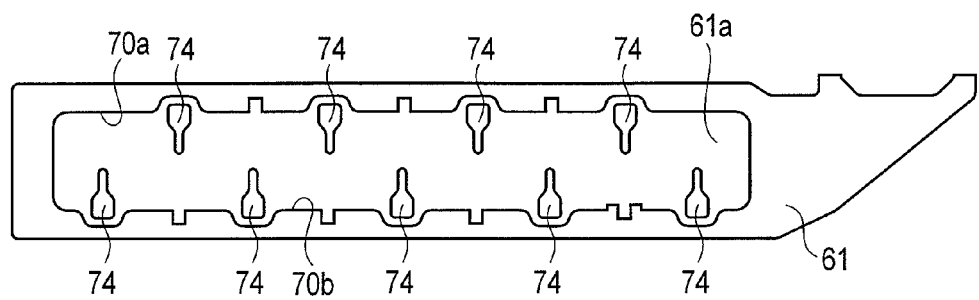
FIG. 6 is an exemplary plan view showing a thin metal plate portion constituting the terminal area of the flexure.
Figure 7:
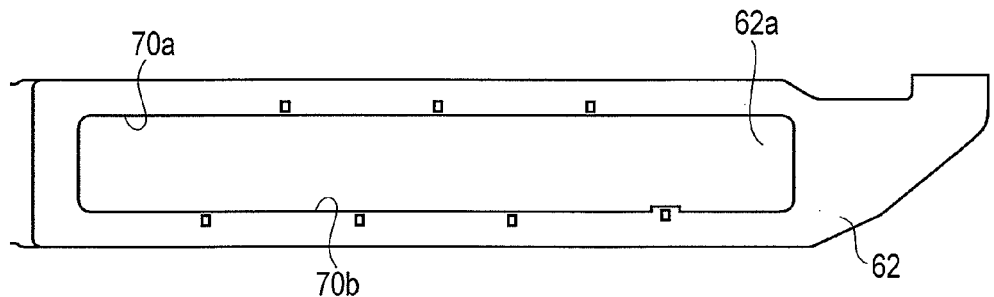
FIG. 7 is an exemplary plan view showing an insulating layer constituting the terminal area of the flexure.
Figure 8:
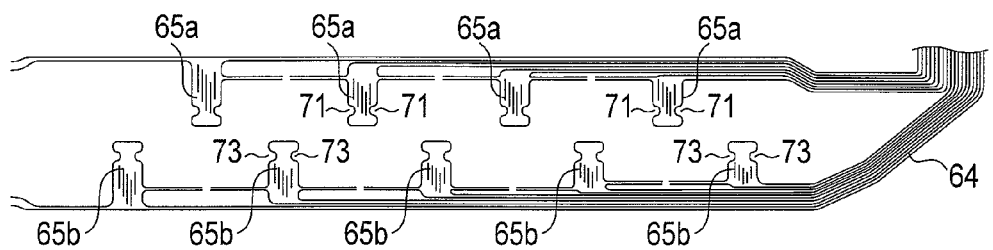
FIG. 8 is an exemplary plan view showing a conductor layer of copper foil constituting the terminal area of the flexure.

As shown in FIGS. 4 to 6, the thin metal plate 61 comprises a plurality of reinforcing portions 74 in the form of independent islands. These reinforcing portions 74 are affixed individually to the respective surfaces of their corresponding first or second connection terminals 65a or 65b and reinforce the terminals. Each reinforcing portion 74 is electrically separated from the other part of the thin metal plate 61 and has an area less than that of each connection terminal.

Figure 9:
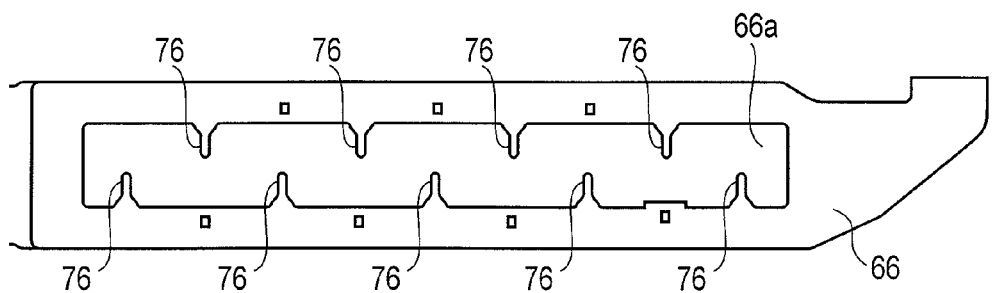
FIG. 9 is an exemplary plan view showing a cover insulating layer constituting the terminal area of the flexure.

As shown in FIGS. 4, 5 and 9, the cover insulating layer 66 integrally comprises a plurality of protrusions 76 that individually project into the opening 66a. These protrusions 76 are affixed individually to the respective reverse surfaces of the first or second connection terminals 65a or 65b and reinforce the terminals. Each protrusion 76 has an area less than that of each of the first and second connection terminals.

As schematically shown in FIGS. 2 and 5, on the other hand, the connecting end portion 42 of the main FPC 21b to which the terminal area 60 of the flexure 40 is connected comprises a plurality of connection pads 80. The connection pads 80 are arranged in a zigzag corresponding to the first and second connection terminals of the terminal area 60. A solder bump 82 is formed on each connection pad 80.

The terminal area 60 of the flexure 40 is bent substantially at right angles to the other part of the flexure and superposed on the connecting end portion 42 of the main FPC 21b. The first and second connection terminals 65a and 65b of the terminal area 60 are oppositely located on their corresponding solder bumps 82 of the main FPC 21b. In this state, the connection terminals 65a and 65b can be soldered to their corresponding connection pads 80 by, for example, applying a soldering iron to the thin metal plate 61 from above to melt the solder bumps 82.

According to the HDD constructed in this manner, each magnetic disk 16 is rotated at high speed, and the voice coil 41 is energized to start operation. Thereupon, the HSA 22 pivots around the bearing unit 28 so that each magnetic head 17 is moved to and positioned on a desired track of the disk 16. The head 17 performs data processing, that is, writing and reading, on the magnetic disk 16.

In each HGA 30, the terminal area 60 of the flexure 40 comprises an opening extending longitudinally relative to the terminal area. The first and second connection terminals extend into the opening from its opposite longitudinal side edges and are alternately arranged in the longitudinal direction. Accordingly, the clearance between each two adjacent connection terminals can be enlarged. Thus, the number of terminals at the terminal area 60 of the flexure 40 and that of the main FPC can be further increased to cope with an increase in the number of terminals caused by the introduction of new technologies, such as assisted recording, a two-step actuator, etc.

Figure 10:
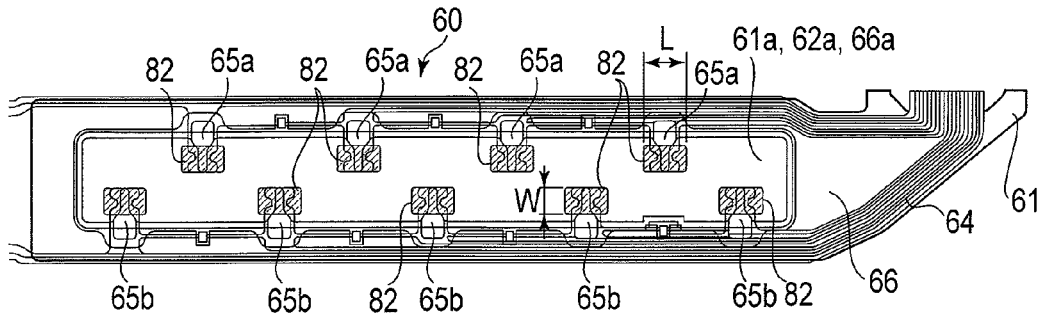
FIG. 10 is an exemplary plan view showing how the terminal area of the flexure is connected to solder bumps on a main FPC.
Figure 11:
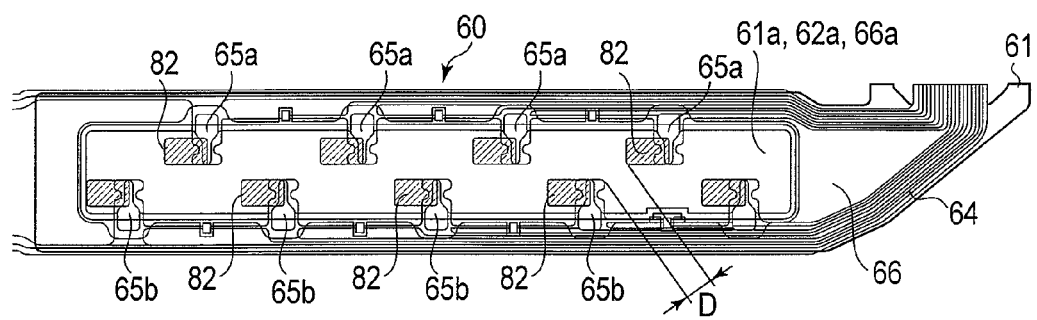
FIG. 11 is an exemplary plan view showing how the terminal area of the flexure is deviated from the solder bumps on the main FPC when connected thereto.

FIG. 10 shows how the terminal area 60 of the flexure 40 is superposed in position on the solder bumps 82 on the connecting end portion 42 of the main FPC 21b, and FIG. 11 shows how the solder bumps 82 are maximally deviated from the terminal area 60. If length L and width W of each solder bump 82 are 0.3 and 0.2 mm, respectively, distance D between each of the first and second connection terminals 65a and 65b and its adjacent solder bump 82 is about 0.19 mm even when the solder bumps are maximally deviated, as shown in FIG. 11. This ensures a clearance about 1.9 times greater than in the conventional case. Thus, a reliable design can be achieved that is not likely to cause a short-circuit due to such a positional deviation, and in addition, the number of terminals can be increased.

Accordingly, there may be provided a large-capacity, high-performance HGA and magnetic disk drive capable of providing various additional functions.

The following is a description of a flexure of an HGA of an HDD according to a second embodiment.

Figure 12:
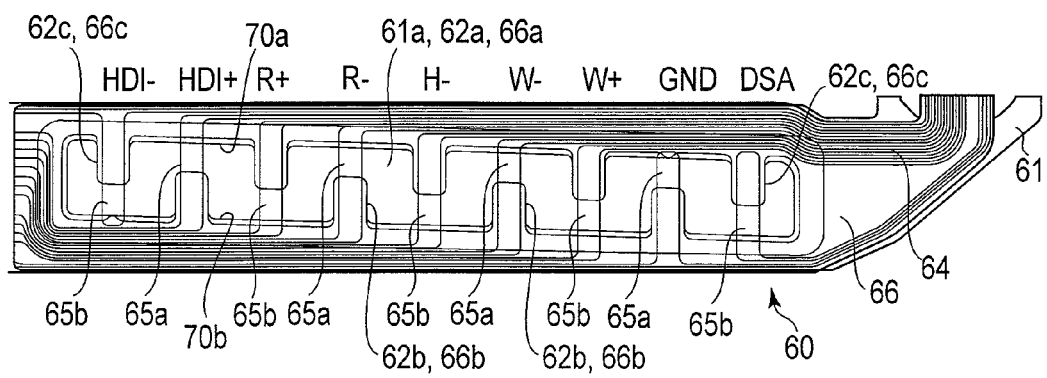
FIG. 12 is an exemplary enlarged plan view showing a terminal area of a flexure of an HDD according to a second embodiment.
Figure 13:
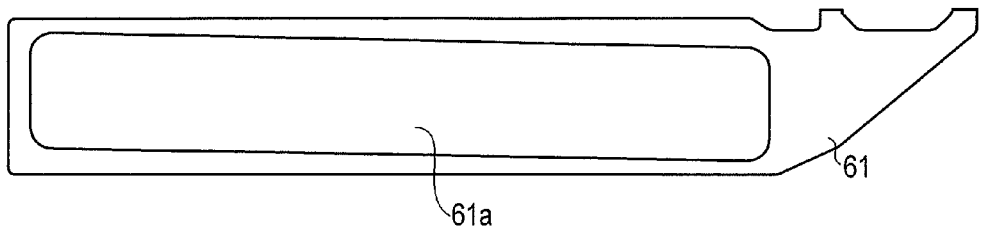
FIG. 13 is an exemplary plan view showing a thin metal plate portion constituting the terminal area of the flexure.

FIG. 12 is a plan view showing a terminal area 60 of a flexure 40 of the HGA of the HDD according to the second embodiment, and FIGS. 13 to 16 show constituent elements of the flexure, that is, a thin metal plate, base insulating layer, conductor pattern of copper foil, and cover insulating layer, respectively.

According to the second embodiment, as shown in FIGS. 12 to 16, the terminal area 60 of the flexure has an elongated, substantially rectangular shape. In the terminal area 60, a thin metal plate 61, base insulating layer 62, and cover insulating layer 66, which constitute the flexure, are formed with elongated rectangular openings 61a, 62a and 66a, respectively. These openings 61a, 62a and 66a extend substantially longitudinally relative to the terminal area 60. The metal plate 61 and insulating layers 62 and 66 are laminated so that the openings 61a, 62a and 66a overlap one another.

Conductors of a trace pattern 64 laminated between the base and cover insulating layers 62 and 66 are led around so that they are split on both transverse sides of the opening 61a and extend along both longitudinally extending side edges of the opening 61a on the base insulating layer 62. The trace pattern 64 comprises a plurality (e.g., four) of first connection terminals 65a formed continuous with the conductors, individually, and a plurality (e.g., five) of second connection terminals 65b formed continuous with the other conductors, individually.

Each of the first and second connection terminals 65a and 65b is in the form of a band extending across the opening 61a. Specifically, each connection terminal extends into the opening 61a from one of its opposite longitudinal side edges and beyond the other side edge. Further, the connection terminals 65a and 65b are alternately arranged at substantially regular intervals along the length of the opening 61a.

Figure 14:
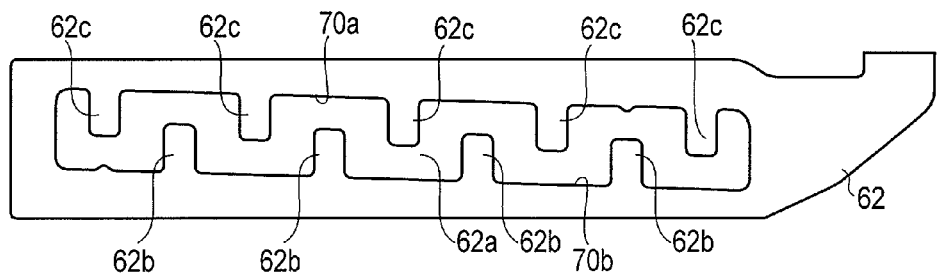
FIG. 14 is an exemplary plan view showing an insulating layer constituting the terminal area of the flexure.
Figure 15:
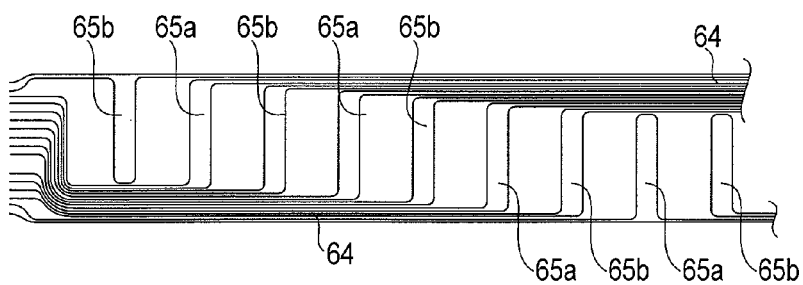
FIG. 15 is an exemplary plan view showing a conductor layer of copper foil constituting the terminal area of the flexure.

As shown in FIGS. 12 and 14, the base insulating layer 62 integrally comprises four first lugs 62b individually protruding into the opening 62a from its one longitudinal side edge 70b and four second lugs 62c individually protruding into the opening 62a from its other longitudinal side edge 70a.

Figure 16:
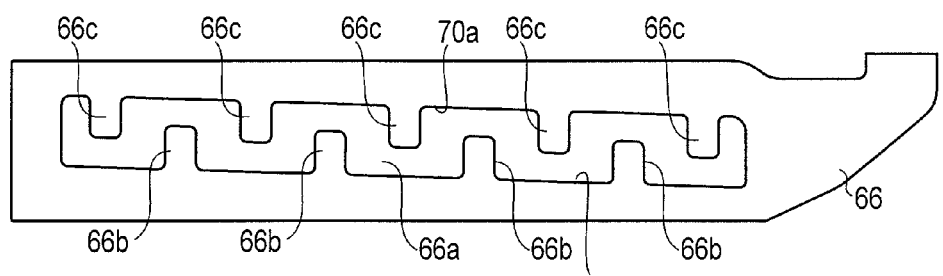
FIG. 16 is an exemplary plan view showing a cover insulating layer constituting the terminal area of the flexure.

As shown in FIGS. 12 and 16, the cover insulating layer 66 integrally comprises four first lugs 66b individually protruding into the opening 66a from its one longitudinal side edge 70b and four second lugs 66c individually protruding into the opening 66a from its other longitudinal side edge 70a.

As shown in FIG. 12, a part of each first connection terminal 65a (about half on the side of the one side edge 70a of the opening 61a in this case) is covered by its corresponding first lugs 62b and 66b of the base and cover insulating layers 62 and 66 from both sides. Thus, only the remaining half of each first connection terminal 65a is exposed in the opening 61a and serves as an electrically conductive connection terminal.

A part of each second connection terminal 65b (about half on the side of the side edge 70b of the opening 61a in this case) is covered by its corresponding second lugs 62c and 66c of the base and cover insulating layers 62 and 66 from both sides. Thus, only the remaining half of each second connection terminal 65b is exposed in the opening 61a and serves as an electrically conductive connection terminal.

At the terminal area 60 of the flexure 40, therefore, the substantial terminal portions of the first and second connection terminals 65a and 65b extend into the opening 61a from its opposite longitudinal side edges and are alternately arranged in the longitudinal direction. Also in this arrangement, the clearance between each two adjacent connection terminals can be enlarged. Thus, the number of terminals at the terminal area 60 of the flexure 40 and that of a main FPC can be further increased to cope with an increase in the number of terminals caused by the introduction of new technologies, such as assisted recording, a two-step actuator, etc.

Since other configurations of the HGA and HDD of the second embodiment are the same as those of the first embodiment, like reference numbers are used to designate like portions, and a detailed description thereof is omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Although the conductors and connection terminals of the flexure are assumed to include nine types herein, they may be increased or decreased if necessary. The respective arms of the HGAs used in each of the embodiments described herein are independent plate-like arms. However, these arms may be replaced with a so-called E-block structure comprising a plurality of arms and a bearing sleeve that are formed integrally with one another. The magnetic disks are not limited to 2.5-inch disks and may be of other sizes. The disks used are not limited to two in number and may be one or three or more. The number of HGAs may also be varied according to the number of installed disks.

What is claimed is:

1. A head gimbal assembly comprising:
a suspension;
a head supported by the suspension; and
a trace on the suspension connected to the head and a terminal area,
the trace comprising a metal plate, a base insulating layer on the metal plate, a trace pattern on the base insulating layer comprising a plurality of conductors and a plurality of first terminals and a plurality of second terminals continuous with the plurality of conductors, and a cover insulating layer on the base insulating layer configured to cover the trace pattern, the terminal area of the trace comprising an opening with a first edge and a second edge, the plurality of first terminals extending into the opening from the first edge and the plurality of second terminals extending into the opening from the second edge.

2. The head gimbal assembly of claim 1, wherein the plurality of first terminals are arranged at intervals along the first edge of the opening, and the plurality of second terminals are arranged at intervals along the second edge of the opening.

3. The head gimbal assembly of claim 2, wherein the plurality of first terminals along the first edge of the opening are staggered from the plurality of second terminals along the second edge of the opening, and the plurality of first terminals and the plurality of second terminals are configured alternately.

4. The head gimbal assembly of claim 3, wherein each of the plurality of first terminals extends from the first edge of the opening into a first central portion, and each of the plurality of second terminals extends from the second edge of the opening into a second central portion.

5. The head gimbal assembly of claim 1, wherein the metal plate comprises a plurality of reinforcing portions affixed to the plurality of first terminals and the plurality of second terminals.

6. The head gimbal assembly of claim 5, wherein the cover insulating layer comprises a plurality of protrusions extending into the opening to partially cover the plurality of first terminals and the plurality of second terminals.

7. The head gimbal assembly of claim 1, wherein the plurality of first terminals and the plurality of second terminals extend from the first edge of the opening to the second edge of the opening, the base insulating layer comprises a plurality of first lugs extending into the opening from the first edge to partially cover the plurality of first terminals and a plurality of second lugs extending into the opening from the second edge to partially cover the plurality of second terminals, and the cover insulating layer comprises a plurality of first protrusions extending into the opening from the first edge to partially cover the plurality of first terminals and a plurality of second protrusions extending into the opening from the second edge to partially cover the plurality of second terminals.

8. A disk drive comprising:
a disk recording medium;
a drive motor configured to rotate the recording medium;
a head stack assembly comprising a plurality of head gimbal assemblies; and
a flexible circuit board comprising a connector attached to the head stack assembly;
each of the plurality of head gimbal assemblies comprising a suspension, a head supported by the suspension configured to perform data processing on the recording medium, and a conductor trace on the suspension comprising a first end portion electrically connected to the head and a second end portion comprising a terminal area attached to the connector of the flexible circuit board,
the conductor trace further comprising a metal plate, a base insulating layer on the metal plate, a trace pattern on the base insulating layer comprising a plurality of conductors and a plurality of first terminals and a plurality of second terminals continuous with the plurality of conductors, and a cover insulating layer on the base insulating layer configured to cover the trace pattern,
the terminal area of the conductor trace comprising an opening with a first edge and a second edge, the plurality of first terminals extending into the opening from the first edge and the plurality of second terminals extending into the opening from the second edge.

9. The disk drive of claim 8, wherein the plurality of first terminals are arranged at intervals along the first edge of the opening, and the plurality of second terminals are arranged at intervals along the second edge of the opening.

10. The disk drive of claim 9, wherein the plurality of first terminals along the first edge of the opening are staggered from the plurality of second terminals along the second edge of the opening, and the plurality of first terminals and the plurality of second terminals are configured alternately.

11. The disk drive of claim 10, wherein each of the plurality of first terminals extends from the first edge of the opening into a first central portion, and each of the plurality of second terminals extends from the second edge of the opening into a second central portion.

12. The disk drive of claim 8, wherein the metal plate comprises a plurality of reinforcing portions affixed to the plurality of first terminals and the plurality of second terminals.

13. The disk drive of claim 12, wherein the cover insulating layer comprises a plurality of protrusions extending into the opening to partially cover the plurality of first terminals and the plurality of second terminals.

14. The disk drive of claim 8, wherein the plurality of first terminals and the plurality of second terminals extend across the opening from the first edge of the opening to the second edge, the base insulating layer comprises a plurality of first lugs extending into the opening from the first edge to partially cover the plurality of first terminals and a plurality of second lugs extending into the opening from the second edge to partially cover the plurality of second terminals, and the cover insulating layer comprises a plurality of first protrusions extending into the opening from the first edge to partially cover the plurality of first terminals and a plurality of second protrusions extending into the opening from the second edge to partially cover the plurality of second terminals.

\* \* \* \* \*